(12) United States Patent
Carlson et al.

(10) Patent No.: US 9,800,951 B1
(45) Date of Patent: Oct. 24, 2017

(54) UNOBTRUSIVELY ENHANCING VIDEO CONTENT WITH EXTRINSIC DATA

(71) Applicant: Amazon Technologies, Inc., Seattle, WA (US)

(72) Inventors: Adam Carlson, Seattle, WA (US); Jeromey Russell Goetz, Seattle, WA (US); Douglas Andrew Hungarter, Seattle, WA (US); Charles G. Tritschler, Los Altos, CA (US); Peter A. Larsen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 82 days.

(21) Appl. No.: 14/644,006

(22) Filed: Mar. 10, 2015

Related U.S. Application Data

(63) Continuation-in-part of application No. 13/529,818, filed on Jun. 21, 2012.

(51) Int. Cl.
*H04N 21/81* (2011.01)
*G06F 17/30* (2006.01)
(Continued)

(52) U.S. Cl.
CPC ..... *H04N 21/8133* (2013.01); *G06F 17/3082* (2013.01); *H04N 21/23* (2013.01); *H04N 21/234* (2013.01); *H04N 21/235* (2013.01); *H04N 21/2343* (2013.01); *H04N 21/2355* (2013.01); *H04N 21/2356* (2013.01); *H04N 21/2358* (2013.01); *H04N 21/23439* (2013.01); *H04N 21/25* (2013.01); *H04N 21/251* (2013.01); *H04N 21/258* (2013.01); *H04N 21/25435* (2013.01); *H04N 21/25825* (2013.01);
(Continued)

(58) Field of Classification Search
None
See application file for complete search history.

(56) References Cited

U.S. PATENT DOCUMENTS 5,596,705 A  1/1997  Reimer et al.
5,692,212 A  11/1997  Roach
(Continued)

FOREIGN PATENT DOCUMENTS

WO  2011053271 A1  5/2011
WO  2014036413     3/2014

OTHER PUBLICATIONS

U.S. Appl. No. 14/615,950 entitled "Providing Extrinsic Data for Video Content" and filed Feb. 6, 2015.
(Continued)

*Primary Examiner* — Justin Shepard
(74) *Attorney, Agent, or Firm* — Thomas Horstemeyer LLP

(57) ABSTRACT

The playback of video content upon a display is enhanced through the unobtrusive presentation of extrinsic data upon the same display. A video content feature is rendered on a display. It is determined whether to present extrinsic data relevant to a current time in the video content feature based at least in part on appearance control metadata. A graphical element presenting at least a portion of the extrinsic data is rendered on the display while the video content feature is also being rendered on the display in response to determining to present the extrinsic data.

20 Claims, 7 Drawing Sheets

(51) Int. Cl.
*H04N 21/84* (2011.01)
*H04N 21/431* (2011.01)
*H04N 21/44* (2011.01)
*H04N 21/466* (2011.01)
*H04N 21/435* (2011.01)
*H04N 21/25* (2011.01)
*H04N 21/266* (2011.01)
*H04N 21/442* (2011.01)
*H04N 21/2343* (2011.01)
*H04N 21/234* (2011.01)
*H04N 21/40* (2011.01)
*H04N 21/258* (2011.01)
*H04N 21/23* (2011.01)
*H04N 21/2543* (2011.01)
*H04N 21/235* (2011.01)
*H04N 21/41* (2011.01)
*H04N 21/422* (2011.01)
*H04N 21/43* (2011.01)
*H04N 21/4223* (2011.01)

(52) U.S. Cl.
CPC . *H04N 21/25833* (2013.01); *H04N 21/26603* (2013.01); *H04N 21/40* (2013.01); *H04N 21/41* (2013.01); *H04N 21/422* (2013.01); *H04N 21/4223* (2013.01); *H04N 21/42201* (2013.01); *H04N 21/43* (2013.01); *H04N 21/431* (2013.01); *H04N 21/435* (2013.01); *H04N 21/4312* (2013.01); *H04N 21/4314* (2013.01); *H04N 21/4316* (2013.01); *H04N 21/4318* (2013.01); *H04N 21/44008* (2013.01); *H04N 21/44218* (2013.01); *H04N 21/4667* (2013.01); *H04N 21/8146* (2013.01); *H04N 21/84* (2013.01)

(56) References Cited

U.S. PATENT DOCUMENTS

| | | | |
|---|---|---|---|
| 5,991,799 A | 11/1999 | Yen et al. | |
| 6,065,042 A | 5/2000 | Reimer et al. | |
| 7,293,275 B1 | 11/2007 | Krieger et al. | |
| 8,019,271 B1* | 9/2011 | Izdepski | H04H 20/57 |
| | | | 455/3.01 |
| 8,209,396 B1 | 6/2012 | Raman et al. | |
| 8,351,647 B2* | 1/2013 | Sharma | G06Q 30/02 |
| | | | 382/103 |
| 8,644,702 B1 | 2/2014 | Kalajan | |
| 8,689,255 B1 | 4/2014 | Gregov et al. | |
| 8,763,041 B2 | 6/2014 | Timmermann et al. | |
| 8,887,226 B2 | 11/2014 | Kimura et al. | |
| 8,955,021 B1 | 2/2015 | Treder et al. | |
| 2002/0059610 A1 | 5/2002 | Ellis | |
| 2002/0087974 A1 | 7/2002 | Sprague | |
| 2002/0162117 A1* | 10/2002 | Pearson | H04N 5/445 |
| | | | 725/109 |
| 2004/0117831 A1* | 6/2004 | Ellis | H04N 5/44543 |
| | | | 725/53 |
| 2004/0133919 A1 | 7/2004 | Incentis | |
| 2004/0160386 A1* | 8/2004 | Michelitsch | G09G 5/00 |
| | | | 345/10 |
| 2005/0160465 A1 | 7/2005 | Walker | |
| 2005/0177538 A1 | 8/2005 | Shimizu et al. | |
| 2005/0229233 A1 | 10/2005 | Zimmerman et al. | |
| 2006/0120689 A1 | 6/2006 | Baxter | |
| 2006/0143683 A1 | 6/2006 | Mampaey | |
| 2006/0271836 A1 | 11/2006 | Morford et al. | |
| 2008/0002021 A1 | 1/2008 | Guo et al. | |
| 2008/0005767 A1* | 1/2008 | Seo | H04N 7/163 |
| | | | 725/62 |
| 2008/0066135 A1 | 3/2008 | Brodersen et al. | |
| 2008/0172293 A1 | 7/2008 | Raskin et al. | |
| 2008/0209465 A1 | 8/2008 | Thomas et al. | |
| 2008/0231751 A1* | 9/2008 | Zalewski | H04N 5/147 |
| | | | 348/578 |
| 2009/0019009 A1 | 1/2009 | Byers | |
| 2009/0055869 A1 | 2/2009 | Young et al. | |
| 2009/0055884 A1* | 2/2009 | Park | G11B 27/105 |
| | | | 725/137 |
| 2009/0094113 A1 | 4/2009 | Berry et al. | |
| 2009/0138906 A1 | 5/2009 | Eide et al. | |
| 2010/0153831 A1 | 6/2010 | Beaton | |
| 2010/0199219 A1 | 8/2010 | Poniatowski et al. | |
| 2011/0053271 A1 | 3/2011 | Petzold et al. | |
| 2011/0067061 A1 | 3/2011 | Karaoguz et al. | |
| 2011/0099263 A1 | 4/2011 | Patil et al. | |
| 2011/0162002 A1 | 6/2011 | Jones et al. | |
| 2011/0167468 A1 | 7/2011 | Lee et al. | |
| 2011/0181496 A1 | 7/2011 | Lanier et al. | |
| 2011/0246495 A1 | 10/2011 | Mallinson | |
| 2011/0247038 A1* | 10/2011 | Roberts | H04N 5/44513 |
| | | | 725/46 |
| 2011/0282906 A1 | 11/2011 | Wong | |
| 2012/0072953 A1 | 3/2012 | James et al. | |
| 2012/0151530 A1 | 6/2012 | Krieger et al. | |
| 2012/0167146 A1 | 6/2012 | Incorvia | |
| 2012/0210349 A1 | 8/2012 | Campana et al. | |
| 2012/0233646 A1 | 9/2012 | Coniglio et al. | |
| 2012/0308202 A1 | 12/2012 | Murata et al. | |
| 2012/0324493 A1 | 12/2012 | Holmdahl et al. | |
| 2012/0324495 A1 | 12/2012 | Matthews, III et al. | |
| 2013/0014155 A1 | 1/2013 | Clarke et al. | |
| 2013/0047155 A1 | 2/2013 | Caspole | |
| 2013/0060660 A1 | 3/2013 | Maskatia et al. | |
| 2013/0347018 A1* | 12/2013 | Limp | H04N 21/4826 |
| | | | 725/19 |
| 2014/0068670 A1 | 3/2014 | Timmermann et al. | |
| 2014/0208355 A1 | 7/2014 | Gregov et al. | |
| 2014/0250488 A1* | 9/2014 | Kang | H04N 5/4403 |
| | | | 725/142 |
| 2014/0337033 A1* | 11/2014 | Kim | A61H 3/061 |
| | | | 704/260 |
| 2014/0359656 A1* | 12/2014 | Banica | H04N 21/812 |
| | | | 725/32 |
| 2015/0156562 A1 | 6/2015 | Treder | |
| 2015/0357001 A1 | 12/2015 | Aliverti | |

OTHER PUBLICATIONS

U.S. Appl. No. 14/034,055 entitled "Playback of Content Using Multiple Devices" and filed Sep. 23, 2013.
U.S. Appl. No. 13/601,235 entitled "Timeline Interface for Video Content" and filed Aug. 31, 2012.
"Entertainment is more amazing with Xbox SmartGlass," Xbox SmartGlass 1 Companion Application—Xbox.com, retrieved from "http://www.xbox.com/en-US/smartglass," retrieved Dec. 4, 2012.
U.S. Appl. No. 13/927,970 entitled "Providing Soundtrack Information During Playback of Video Content" and filed Jun. 26, 2013.
U.S. Appl. No. 13/709,768 entitled "Providing Content Via Multiple Display Devices" and filed Dec. 10, 2012.
U.S. Appl. No. 13/778,846 entitled "Shopping Experience Using Multiple Computing Devices" and filed Feb. 27, 2013.
International Searching Authority and Written Opinion mailed Mar. 21, 2014 for PCT/US2013/057543 filed Aug. 30, 2013.
"Sony Pictures to smarten up Blu-ray with MovieiQ, the 'killer app for BD-Live,'" Engadget, retrieved from http://www.engadget.com/2009/06/18/sony-pictures-to-smarten-up-blu-ray-with-movieiq-the-killer-ap/, Jun. 18, 2009.
"Hulu 'Face Match' feature attaches an actor's entire history to their mug," Engadget, retrieved from http://www.engadget.com/2011/12/08/hulu-face-match-feature-attaches-an-actors-entire-history-to/, Dec. 8, 2011.
"TVPlus for the iPad," iTunes Store, retrieved from "http://itunes.apple.com/us/app/tvplus/id444774882?mt=B," updated Apr. 13, 2012.
"Wii U GamePad," Wii U Official Site-Features, retrieved from "http://www.nintendo.com/wiiu/features/," retrieved Dec. 4, 2012.

(56) References Cited

OTHER PUBLICATIONS

International Search Report and Written Opinion from PCT/US2013/047155 dated Feb. 7, 2014.

* cited by examiner

UNOBTRUSIVELY ENHANCING VIDEO CONTENT WITH EXTRINSIC DATA

CROSS-REFERENCE TO RELATED APPLICATIONS

This application is a continuation-in-part of, and claims priority to, co-pending U.S. patent application entitled "PROVIDING SUPPLEMENTAL CONTENT WITH ACTIVE MEDIA," filed on Jun. 21, 2012, and assigned application Ser. No. 13/529,818, which is incorporated herein by reference in its entirety.

BACKGROUND

People often want more information about the movies and other video content they are watching. To this end, people may search the Internet to find out more information about the video content. This information may include, for example, biographies of actors, production information, trivia, goofs, and so on.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to enhancing video content in an unobtrusive manner with extrinsic data such as, for example, cast and character images and information, biographical information, quotations, trivia, goofs, related offerings, scene information, and other extrinsic data. Video content features may be offered for downloading or streaming from a server to a client via a network, and the extrinsic data may be sent to the client along with the video content feature. Additional information may be shown on screen while the video content feature is playing to enhance the viewing experience. As an example, when a character appears on screen, a graphical element may appear on the screen indicating the name of the character and the name of the corresponding cast member who performs the character. As another example, when music begins playing in a video content feature, a graphical element may appear indicating the name of the music track and the name of the artist.

In one embodiment, the display of these graphical elements may be enabled by default, without user intervention. Thus, to avoid any user annoyance, it is desirable to leverage a deeper understanding of a user in determining what information to show and when and also to render these graphical elements as unobtrusively as possible. For example, the graphical elements may be sized as small as possible to minimize the portion of the video that is obscured, while also maintaining legibility of the graphical elements. In addition, the location of the graphical elements may be selected to avoid obscuring faces or other important visual details of the video content. It is also desirable to minimize the display of redundant information or information of which the user is likely already aware. For example, information about a character may be shown only once for a video content feature, such as when the character first appears on screen. Further, if a user is watching the video content feature for a second time, or is otherwise likely aware of the characters in the video content feature, such character information may be suppressed or replaced with trivia or other information more likely to be of interest to the user. In some cases, the graphical elements may be rendered in response to a user pausing playback, activating a button (e.g., an up arrow) on a remote control, or taking some other action.

Figure 1A:
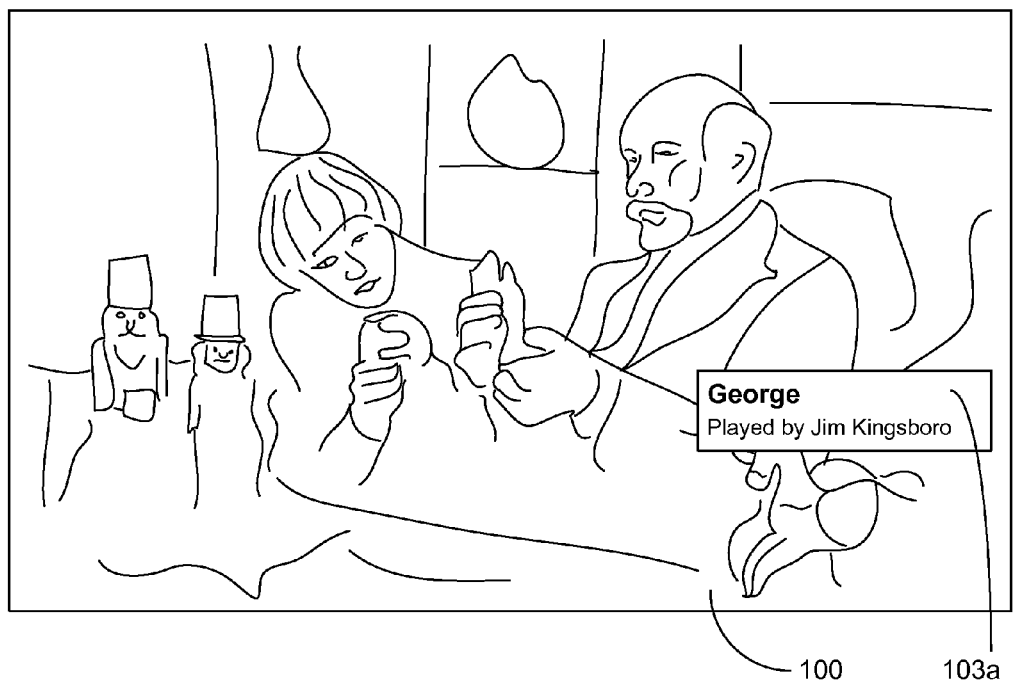
FIGS. 1A-1C are pictorial diagrams of example video content features rendered on a display according to various embodiments of the present disclosure.

Referring now to FIG. 1A, shown is one example of a video content feature 100 rendered upon a display in accordance with one embodiment of the present disclosure. The video content feature 100 corresponds to a movie, and what is shown in FIG. 1A corresponds to the beginning of a specific scene in the movie in which two characters first appear. The graphical element 103a is rendered on top of the video content feature 100 to provide information about one of the two characters, whose character name is "George." Additionally, the graphical element 103a informs the viewer that the character is played by a cast member whose name is "Jim Kingsboro." In various embodiments, the character name and/or cast member name may be shown alone, or the graphical element 103a may include a generic image of the cast member such as a headshot.

The location of the graphical element 103a upon the display may be selected such that the graphical element 103a does not obscure an important part of the underlying video content feature 100. For example, the location may be selected based at least in part on face detection so as not to obscure any character faces. Further, the location may be selected to be near the face of the character to which it pertains. In one scenario, the entirety of the video content feature 100 may be analyzed to determine a particular location for the graphical element 103a that is likely to be unobtrusive. For example, the lower left corner of the screen in a particular video content feature 100 may have relatively low action throughout the video content feature 100. Each graphical element 103 may be shown for a period of time that is deemed unobjectionable to the average viewer, yet long enough for the viewer to perceive and recognize the content.

Figure 1B:
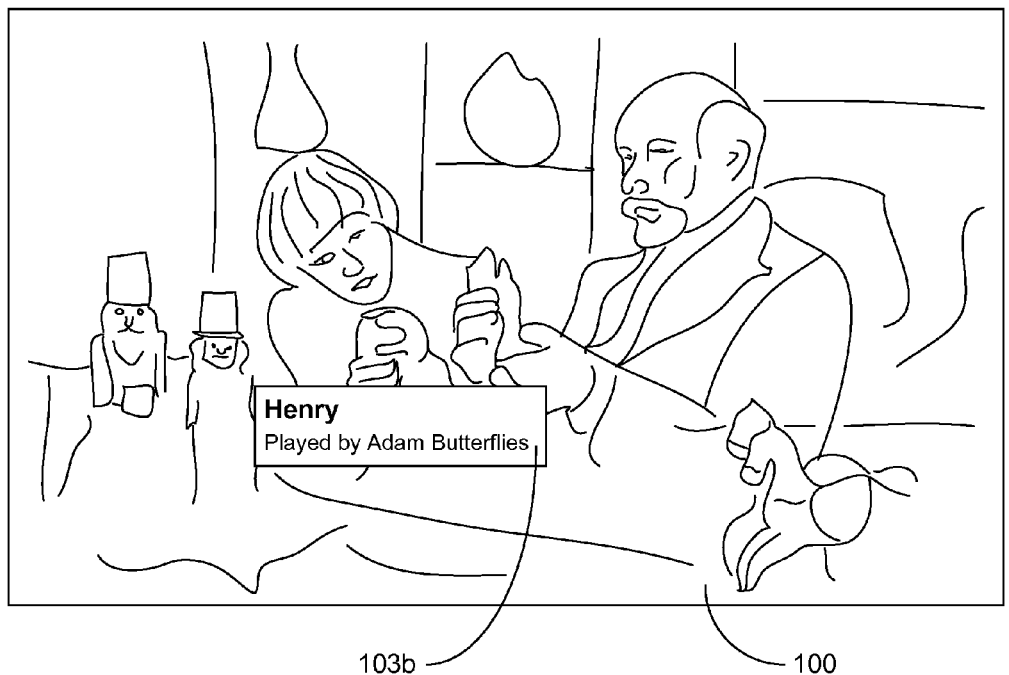

Moving on to FIG. 1B, shown is another example of the video content feature 100 rendered upon a display in accordance with one embodiment of the present disclosure. FIG. 1B shows a different graphical element 103b that provides information about the second character that appears in the scene, a character that is named "Henry" and who is performed by a cast member named "Adam Butterflies." The graphical element 103b is shown in a different location upon the video content feature 100 based upon the location of the character to which it pertains, which as previously mentioned may be determined, for example, by way of face detection. The graphical elements 103a and 103b may be shown in a sequence, one right after another. In another embodiment, the graphical elements 103a and 103b may be shown concurrently upon the display, perhaps based at least in part on a maximum number of graphical elements 103 that may be shown concurrently.

Figure 1C:
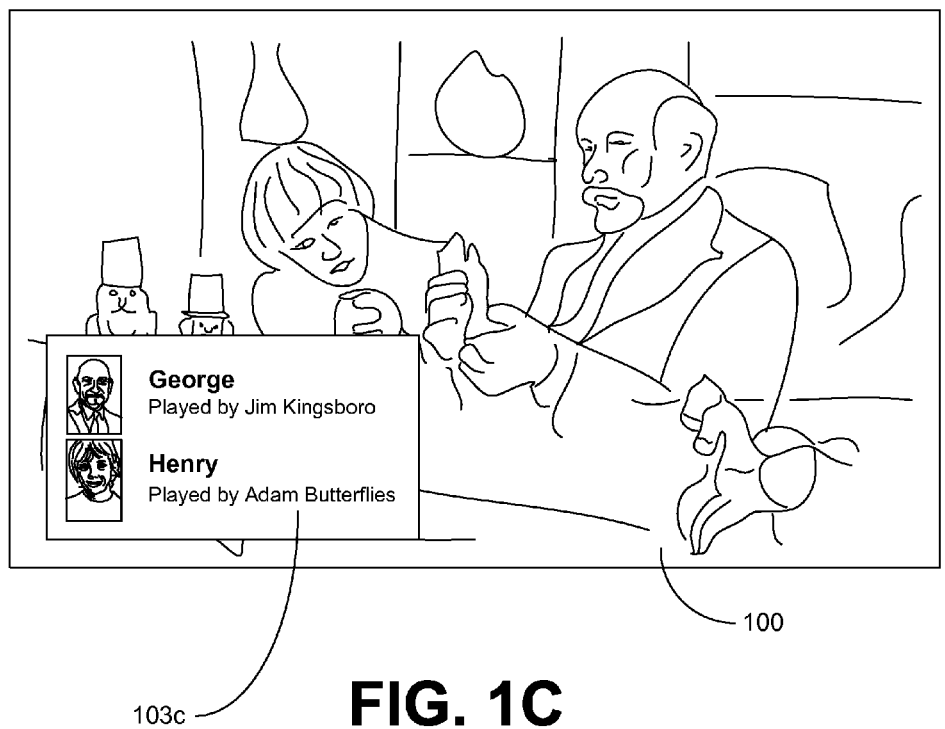

Referring now to FIG. 1C, shown is another example of the video content feature 100 rendered upon a display in accordance with one embodiment of the present disclosure. In the example of FIG. 1C, a single graphical element 103c is rendered with the character information for both characters that appear in the scene. In order to disambiguate which information pertains to which character on-screen, a small image of the character or cast member may be shown. In the following discussion, a general description of the system and its components is provided, followed by a discussion of the operation of the same.

Figure 2:
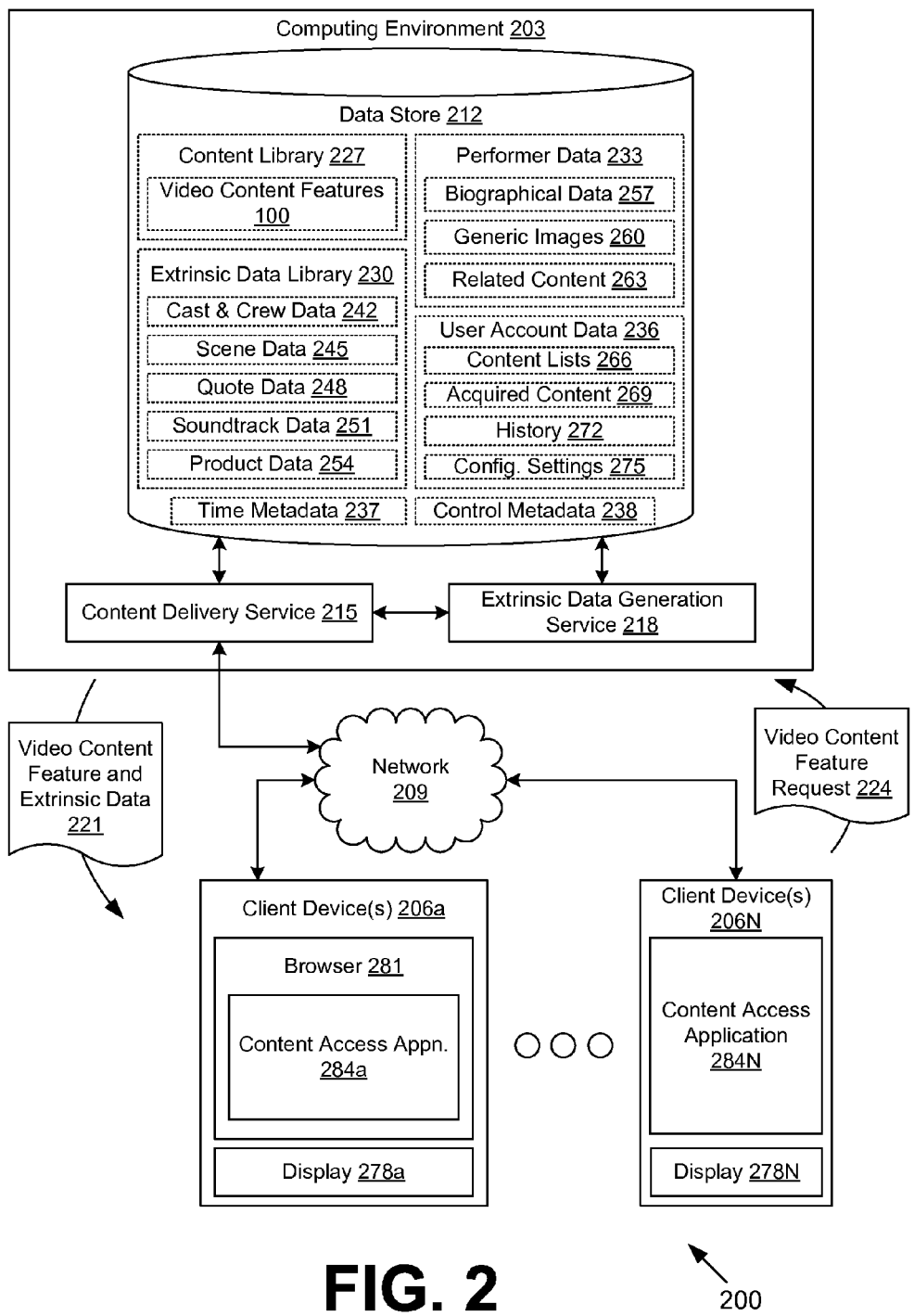
FIG. 2 is a schematic block diagram of a networked environment according to various embodiments of the present disclosure.

With reference to FIG. 2, shown is a networked environment 200 according to various embodiments. The networked environment 200 includes a computing environment 203 and a plurality of client devices 206a . . . 206N in data communication via a network 209. The network 209 includes, for example, the Internet, intranets, extranets, wide area networks (WANs), local area networks (LANs), wired networks, wireless networks, or other suitable networks, etc., cable networks, satellite networks, or any combination of two or more such networks.

The computing environment 203 may comprise, for example, a server computer or any other system providing computing capability. Alternatively, the computing environment 203 may employ a plurality of computing devices that may be employed that are arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a content delivery service 215, an extrinsic data generation service 218, and other applications, services, processes, systems, engines, or functionality not discussed in detail herein. The content delivery service 215 is executed to serve up or stream video content to client devices 206. The content delivery service 215 may support a resume functionality such that playback of video content may be stopped at a point in the video content on one device and later resumed at that point on the same device or a different device. The content delivery service 215 is configured to send extrinsic data to the client devices 206 accompanying the video content. To this end, the content delivery service 215 sends the video content feature and extrinsic data 221 to the client devices 206 in response to video content feature requests 224.

The extrinsic data generation service 218 is executed to generate extrinsic data to be sent along with video content to client devices 206. For example, the extrinsic data generation service 218 may generate biographical information about performers from multiple sources, such as, for example, editorially curated sources and non-editorially curated sources. Also, the extrinsic data generation service 218 may select images to be used to represent cast members, which may be generic images or images of characters taken from the video content itself. The extrinsic data generation service 218 may also determine products and audio tracks which are associated with various scenes in the video content for promotional purposes.

The extrinsic data generation service 218 may generate a collection of extrinsic data to be sent to the client device 206 along with initial portions of the video feature. In so doing, the extrinsic data generation service 218 may be configured to compress the collection of extrinsic data. The extrinsic data generation service 218 may also determine whether an offline mode is supported by the client device 206. In response to such a determination, the extrinsic data generation service 218 may include resources if the offline mode is supported, or include uniform resource locators (URLs) to such resources if the offline mode is not supported. Various techniques relating to extrinsic data and video content features are described in U.S. Pat. No. 8,689,255 entitled "SYNCHRONIZING VIDEO CONTENT WITH EXTRINSIC DATA," which issued on Apr. 1, 2014 and is incorporated herein by reference in its entirety.

It is noted that the extrinsic data for video content may change over time. To this end, the extrinsic data generation service 218 may dynamically generate the extrinsic data for a particular video content feature multiple times, using the latest updated data. The extrinsic data may be generated by the extrinsic data generation service 218 upon each request for a video content feature. The extrinsic data may be cached within a content delivery network if regeneration is not performed. The extrinsic data generation service 218 may also generate appearance control metadata that controls when extrinsic data is to be shown on screen.

The data stored in the data store 212 includes, for example, a content library 227, an extrinsic data library 230, performer data 233, user account data 236, time metadata 237, control metadata 238, and potentially other data. The content library 227 may include multiple video content features 100 such as movies, television shows, video clips, and/or other forms of video content. Although described as "video content," it is understood that the video content features 100 may include accompanying audio, closed captioning text, and/or other data. It is noted that the content library 227 may be absent in some embodiments as the computing environment 203 may generate and send the extrinsic data and not actually present the content.

The extrinsic data library 230 includes various extrinsic data items that are associated with the video content features 100. Non-limiting examples of the extrinsic data items may include names or descriptions of performers in the video content features 100, biographies or filmographies of the performers, commentary, trivia, mistakes, user comments, images, and/or other data. The extrinsic data items may include curated data that is professionally managed, verified, or is otherwise trustworthy.

For example, the extrinsic data library 230 may include cast and crew data 242, scene data 245, trivia data 248, soundtrack data 251, product data 254, and/or other data. The cast and crew data 242 include the name, character information, images, and other data describing cast members who perform in a video content feature 100 or crew members who are involved in the production of the video content feature 100. The images may correspond to generic images not taken from the video content feature 100 and/or character images captured from or defined as a portion of a frame of the video content feature 100.

The scene data 245 divides a video content feature 100 into multiple scenes. A scene corresponds to a period of time in the video content feature 100 having multiple frames, and may be determined as having a distinct plot element or setting. The scene data 245 may identify the cast members or characters who perform in a given scene. In some cases, the scene data 245 may record the times when the cast members or characters first appear in the scene, last appear in the scene, or are on-screen. In some embodiments, the times may be represented as a frame number, or a range of frame numbers, in the video content feature 100. The scene data 245 may also include positional or location information as to where cast members and/or products appear within a frame on screen. The trivia data 248 may include various trivia items, goofs, and other interesting tidbits of information for the video content feature 100 and may be correlated with times in the video content features 100 and/or scenes in the video content features 100. In addition to trivia data 248, the extrinsic data library 230 may include data relating to quotations, user-generated comments, and so on, which may be correlated to particular times or scenes within the video content feature 100.

The soundtrack data 251 may include various information about the audio of the video content feature 100. For example, the soundtrack data 251 may identify that a particular audio track is being used at a certain time in the video content feature 100 or during a certain scene of the video content feature 100. The soundtrack data 251 may indicate whether the audio corresponds to a title or theme track. In addition, the soundtrack data 251 may identify performers who vocally perform characters in the audio. Such performers may be considered cast members. However, such performers may differ from cast members who visually perform the same characters in some cases, for example, when a song is recorded by a vocalist and a different performer merely lip-syncs to the recorded song in the video of the video content feature 100.

The product data 254 may identify associations of products with times or scenes in video content features 100. The products may correspond to any item offered for purchase, download, rental, or other form of consumption. For example, a particular brand of potato chips may be shown and/or mentioned in dialogue of a movie. The product data 254 may be used to promote products that are related to various scenes in the video content features 100 at the appropriate times. Such promotions may be rendered relative to a position of the product within a frame of the video content feature 100. Such products may also include books, electronic books, soundtrack albums, etc. that are related to the video content feature 100. For example, the video content feature 100 may be an adaptation of a book, or the album might be for the soundtrack of the video content feature 100.

The performer data 233 may include information about performers in video content features 100. Such performers may be on-screen performers, vocalists, and/or other performers. In some cases, the performer data 233 may include other participants in the video content features 100 such as, for example, crew members and others. The performer data 233 may include biographical data 257, generic images 260, related content 263, and so on. The biographical data 257 may include various information such as stage name, birth name, date of birth, date of death, an editorially curated biography, and/or other information. Such data may be taken from editorially curated sources and/or non-editorially curated sources (e.g., "Wiki" sources).

The generic images 260 correspond to images of the performer which are taken when the performer is not performing a particular character. For example, such an image might be taken at an awards ceremony, at a press conference, at an informal setting, and/or elsewhere. Such an image may be a headshot or other image. Multiple generic images 260 may be provided for a particular performer. For example, a performer may have a lengthy career, and generic images 260 may be included for various times within the career. The related content 263 describes video content features 100 in which the performer appears, directs, produces, or is otherwise connected.

The user account data 236 includes various data about users of the content delivery service 215. The user account data 236 may include content lists 266, acquired content 269, history 272, configuration settings 275, and/or other data. The content lists 266 may correspond to watch lists, wish lists, shopping lists, "favorites" lists, and/or other user-managed lists of video content features 100. The acquired content 269 describes to which content in the content library 100 a user has access. For example, a user may have rented or purchased a particular video content feature 100. In some cases, a user may have a subscription that provides access to all or some of the video content features 100. Such a subscription may be limited in some way (e.g., number of titles, number of bytes, quality level, time of day, etc.) or unlimited.

The history 272 may include various data describing behavior of a user. Such data may include a purchase history, a browsing history, a viewing history, explicitly configured viewing preferences, and/or other data. As understood herein, a "user" may refer to one or more people capable of using a given user account. For example, a user may include one or more family members, roommates, etc. In various embodiments, the extrinsic data may be presented based at least in part on history of a user account generally, history of a user account attributable to a specific person, and/or history of one or more related user accounts.

The configuration settings 275 may include various parameters that control the presentation of extrinsic data in conjunction with video content features 100. For example, one of the configuration settings 275 may indicate that certain extrinsic data should be presented automatically on the same display as the video content feature 100, where the extrinsic data is to be presented in an unobtrusive manner. Such a configuration setting 275 may be enabled by default, but may be disabled by a user upon request. The configuration settings 275 may also specify what types of extrinsic data are to be surfaced automatically (e.g., surface character information automatically but not trivia). Various modes may be established, and different modes may be enabled or disabled for different video content features 100 or types of video content features 100.

The time metadata 237 is used to correlate items in the extrinsic data library 230 with specific points in time in respective video content features 100. The control metadata 238 may be used to control the appearance of graphical elements 103 for items in the extrinsic data library 230 with respect to times specified in the time metadata 237. The control metadata 238 may be generated based at least in part on an account history of one or more users, including the viewing user and/or other users. Also, the control metadata 238 may be generated based at least in part on an intrinsic value of the data item, such as whether it is a paid item or curated item and whether it should be shown at a given time regardless of user account history.

The client devices 206 are representative of a plurality of client devices that may be coupled to the network 209. Each client device 206 may comprise, for example, a processor-based system such as a computer system. Such a computer system may be embodied in the form of a smart television, a desktop computer, a laptop computer, personal digital assistants, cellular telephones, smartphones, set-top boxes, music players, web pads, tablet computer systems, game consoles, electronic book readers, or other devices with like capability. Each client device 206 may include one or more displays 278a . . . 278N. Each display 278 may comprise, for example, one or more devices such as liquid crystal display (LCD) displays, gas plasma-based flat panel displays, organic light emitting diode (OLED) displays, LCD projectors, or other types of display devices, etc. In some embodiments, the displays 278 may correspond to touchscreen displays.

Each client device 206 may be configured to execute various applications such as a browser 281, a respective one of a plurality of content access applications 284a . . . 284N, and/or other applications. The browser 281 may be executed in a client device 206, for example, to access network content served up by the computing environment 203 and/or other servers, thereby rendering a user interface on the display 278. The content access application 284 is executed to obtain video content features 100 from the content delivery service 215 and to render the video content features 100 on the display 278. Additionally, the content access application 284 may be configured to obtain extrinsic data from the content access application 284 and to render a user interface based at least in part on the extrinsic data to enhance the user experience in viewing the video content feature 100. In one embodiment, the content access application 284 may be a plug-in of the browser 281 or otherwise executed in the environment of the browser 281. The client devices 206 may be configured to execute other applications such as, for example, mobile applications, email applications, social networking applications, etc.

Next, a general description of the operation of the various components of the networked environment 200 is provided. To begin, a user may acquire rights to view video content features 100 in a content library 227. A client device 206 associated with a user may request to stream or download a video content feature 100 from the content delivery service 215. The extrinsic data generation service 218 may generate a collection of extrinsic data that is relevant to the video content feature 100. The extrinsic data is sent along with the video content feature 100 to the client device 206 over the network 209. In an alternative embodiment, the video content feature 100 and the extrinsic data are available to the client device 206 on a computer-readable medium.

The content access application 284 of the client device 206 renders the video content feature 100 on the display 278. The content access application 284 may also render various graphical elements 103 (FIGS. 1A & 1B) on the display 278 using the extrinsic data to enhance the user experience. The graphical elements 103 may allow users to quickly learn who is on screen while the video content feature 100 is playing, to understand how they know the particular performer, to discover other video content features 100 related to the performers on screen, among other functionality. The graphical elements 103 may be dynamically updated as the video content feature 100 progresses in the foreground or in the background.

The user may be able to request that a more detailed user interface be rendered upon the display 278 to provide additional information. For example, a snippet of a trivia item may be rendered in a graphical element 103 while the video content feature 100 is playing, but the user may enable a function (e.g., via a remote control) that causes the entirety of the trivia item to be rendered. Various examples of presenting detailed extrinsic information and user interfaces therefor are described in U.S. Pat. No. 8,763,041, entitled "ENHANCING VIDEO CONTENT WITH EXTRINSIC DATA," which issued on Jun. 24, 2014 and is incorporated by reference herein in its entirety. In some cases, more detailed information may be provided with the user pauses or stops playback of the video content feature 100.

Various approaches may be employed to ensure that the extrinsic data presented on the display 278 remains unobtrusive as possible. To begin with, the size of the graphical element 103 may be established to be as small as possible, while remaining easily legible for the viewer. Two factors that may go into determining the size may be the resolution of the display 278 and the estimated distance of the viewer from the display 278. With a relatively higher resolution display 278, the graphical element 103 may be relatively smaller while remaining legible. However, a viewer who sits further away from the display 278 may have a greater difficulty in perceiving the graphical element 103. The resolution of the display 278 may be determined by the client device 206. The estimated distance of the viewer may be determined, for example, by asking a user to supply the estimated distance, by capturing an image via a camera of the client device 206 and analyzing the image to determine how far away people in the image are from the camera, and/or other approaches.

In one embodiment, the size of the graphical element 103 may be determined based at least in part on a user configuration setting for size. For example, a user may configure the size of closed captions to be displayed upon the client device 206. Such a configuration setting may be a good indicator of the user's preference as to size of text for legibility. If other information is available that indicates that a user may be visually impaired, the size of the graphical element 103 and/or text within may be increased.

Avoiding repetition of information may also be helpful to enhance the user experience. For example, information about a character may be shown only in a scene of the video content feature 100 in which the character first recognizably appears. Likewise, information about a music track (e.g., song title, artist name, etc.) may be shown only when the music track first commences play in the video content feature 100.

When the video content feature 100 is an episode of a series, the information that is shown may pertain only to the first recognizable appearance or usage with respect to the entire series. As understood herein, a series may include multiple movies, such as sequels and prequels, which share a common story arc or common characters. Thus, an episode may correspond to an entire movie.

However, in some embodiments, information may be repeated with respect to a playback session. For instance, if a user begins watching ten minutes of a movie one day, and then returns to complete the movie a month later, the first appearance of each character or first usage of a music track in the later playback session may determine whether relevant information is to be automatically presented.

As understood herein, the first recognizable appearance of a character may be the first opportune time to show information relevant to the character. This may differ from the first actual appearance of the character in the video content feature 100. For example, it may be determined that the character's face is partially obscured or that the character appears too briefly on screen during the first actual appearance. Further, the first actual appearance may be with too many other characters so as to make showing the character information distracting or unhelpful. Thus, the extrinsic data generation service 218 may perform an analysis on character appearances to determine whether an appearance is to be considered recognizable. Factors in such a determination may include length of appearance, whether the character speaks, whether the face of the character is visible, whether a predefined number of other characters are present in the scene, size of the character on screen (i.e., is the character only distantly shown), whether the character is in a front-facing pose, lighting of the scene, and so on.

The control metadata 238 may be generated in order to control the appearance of the extrinsic data. The history 272 of a user account may be a factor in determining whether to present extrinsic data. For example, if a user has watched an entire first season of a series of video content features 100, the user may be expected to be familiar with the characters appearing in that season. Accordingly, information about characters that have been already introduced in first season may be omitted when the user commences playback of episodes in the second season. Similarly, if a user has watched a particular video content feature 100 previously, character information and/or other information may be omitted when the video content feature 100 is played back for a subsequent time. Moreover, the content delivery service 215 may be configured to present alternative extrinsic data that may be of more interest to a repeat viewer (e.g., trivia, goofs, etc.).

Although viewing history may be leveraged to avoid repetition, when the previous viewing took place may also be an important factor. For example, if a user watched a given movie over five years ago, it may be helpful to the user to present character and cast information, as the user may have forgotten due to the elapsed time.

Feedback from a user may be leveraged to determine whether to present extrinsic data items. For example, if a user indicates (e.g., by pressing a button on a remote) that the current type of extrinsic data should not be shown, the content delivery service 215 may record this in the history 272 and avoid showing similar types of extrinsic data in the future. Further, such data may be obtained from multiple different users via a crowdsourcing approach to determine whether to show particular extrinsic data items for particular video content features 100, the duration that the extrinsic data items should be shown, the relative size of the graphical elements 103 corresponding to the extrinsic data items, and so on.

It is noted that the graphical elements 103 may be shown on the display 178 for as short a time as possible in order to remain unobtrusive while still providing enough time to perceive the content of the graphical elements 103. In this regard, a fixed duration (e.g., 2.5 seconds or some other duration) may be employed. However, the duration may depend on the type of extrinsic data (e.g., character information, quotes, trivia, etc.) and the type of video content feature 100 (e.g., episode of a reality show, action movie, talk show, etc.). For example, extrinsic data about a music track may be shown during the entirety of the time that the music track is playing. Machine learning techniques may be employed to determine optimal characteristics for presenting the extrinsic data items.

The location of the graphical elements 103 upon the display 278 may also be important to remain unobtrusive. For example, it may be undesirable for the graphical element 103 to obscure a character's face or textual credits within the video content feature 100. In this regard, face detection and/or optical character recognition may be employed to determine locations that should not be obscured. The entirety of the video content feature 100 may be analyzed to determine a general location where the graphical elements 103 may be rendered, based at least in part on a visual characteristic of the video content feature 100. In an example video content feature 100, it may be that the lower left corner of the screen infrequently contains action. Consequently, it may be desirable to render the graphical elements 103 in the lower left corner for that video content feature 100, generally.

In addition, the video content feature 100 may be analyzed to determine an optimal location for showing a graphical element 103. To illustrate, it may be ideal that the graphical element 103 that shows a character's name be rendered near the face of the corresponding character, especially where multiple characters are shown on screen. In this regard, face detection and recognition may be employed to determine the location of the character on screen and to arrange a relative positioning of the graphical element 103 on screen.

In some embodiments, the graphical element 103 may overlap and at least partially obscure a portion of the video content feature 100. The graphical element 103 may be solid or partially transparent to the video content feature 100 rendered underneath. In other embodiments, the graphical element 103 may appear at the bottom, at the top, or to the side of the video content feature 100. The video content feature 100 may be dynamically resized to accommodate the graphical element 103, or the video content feature 100 may be rendered at a fixed configuration so as to accommodate the graphical element 103.

Figure 3:
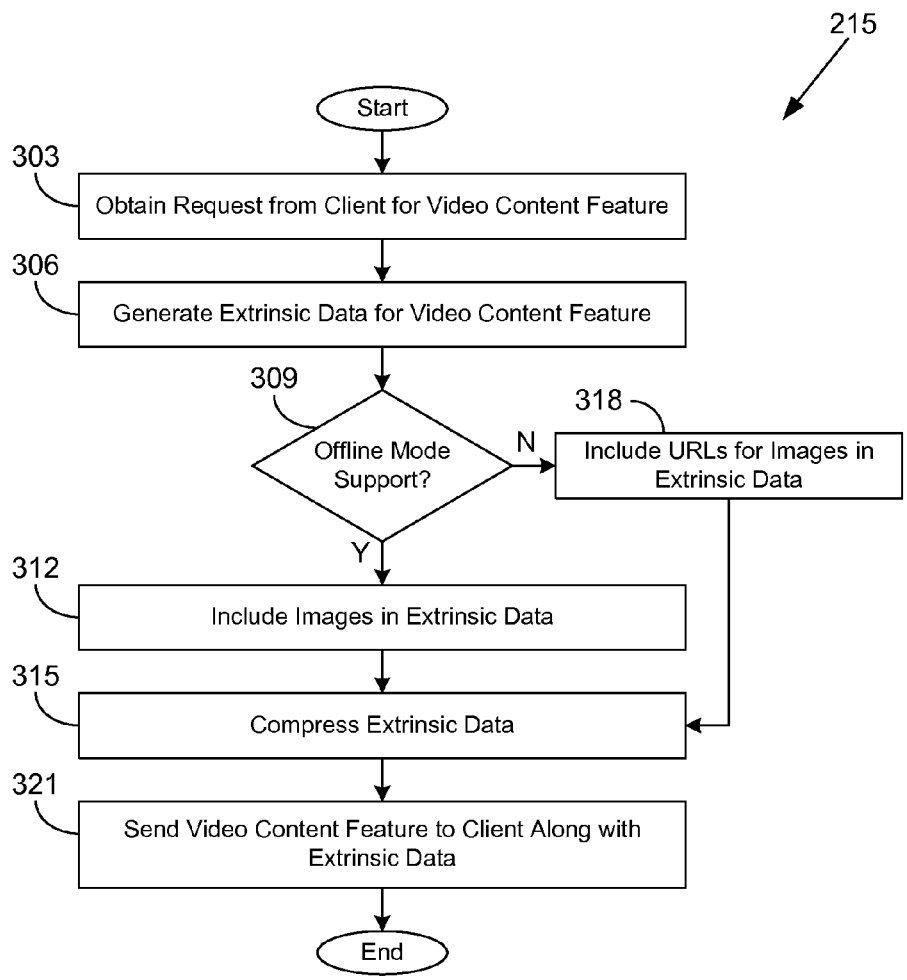
FIG. 3 is a flowchart illustrating one example of functionality implemented as portions of a content delivery service executed in a computing environment in the networked environment of FIG. 2 according to various embodiments of the present disclosure.

Turning now to FIG. 3, shown is a flowchart that provides one example of the operation of a portion of the content delivery service 215 according to various embodiments. It is understood that the flowchart of FIG. 3 provides merely an example of the many different types of functional arrangements that may be employed to implement the operation of the portion of the content delivery service 215 as described herein. As an alternative, the flowchart of FIG. 3 may be viewed as depicting an example of elements of a method implemented in the computing environment 203 (FIG. 2) according to one or more embodiments.

Beginning with box 303, the content delivery service 215 obtains a request from a client device 206 (FIG. 2) for a video content feature 100 (FIG. 2). The content delivery service 215 may then determine whether the client device 206 has a right to access the video content feature 100. The content delivery service 215 may deny access to the video content feature 100 if the client device 206 does not have the corresponding right.

In box 306, the content delivery service 215 employs the extrinsic data generation service 218 (FIG. 2) to generate a collection of extrinsic data for the video content feature 100. The extrinsic data may be customized based at least in part on user account data 236 (FIG. 2) associated with a user at the client device 206. The extrinsic data generation service 218 may generate the extrinsic data depending on one or more external sources of data. In some cases, the content delivery service 215 may utilize a cached version of the extrinsic data collection if regeneration is not to be performed. In some embodiments, the extrinsic data generation service 218 may analyze portions of (i.e., one or more frames) or the entirety of the video content feature 100 to determine locations of graphical elements 103 (FIG. 1A). For example, face detection, text recognition, visual characteristic detection, etc. may be employed to identify optimum locations for the graphical elements 103.

In box 309, the content delivery service 215 determines whether the client device 206 is to support an offline mode. If the client device 206 supports the offline mode, in box 312, the content delivery service 215 includes images in the extrinsic data, such as cast member images and scene images. The content delivery service 215 continues to box 315. If the client device 206 does not support the offline mode, the content delivery service 215 instead proceeds from box 309 to box 318 and includes URLs for the images in the extrinsic data. Thus, the client device 206 may obtain the images on an as-needed basis when online. The content delivery service 215 continues to box 315.

In box 315, the content delivery service 215 may compress the generated collection of extrinsic data. In box 321, the content delivery service 215 sends the video content feature 100 (or an initial portion thereof) to the client device 206 along with the collection of extrinsic data relevant to the video content feature 100. The extrinsic data may be sent automatically or in response to a further request from the client device 206. It is noted that the extrinsic data may be sent within the same network stream as the video content feature 100 or through a different network stream. Further, in some cases, the extrinsic data may be sent without the video content feature 100. Thereafter, the portion of the content delivery service 215 ends.

Figure 4:
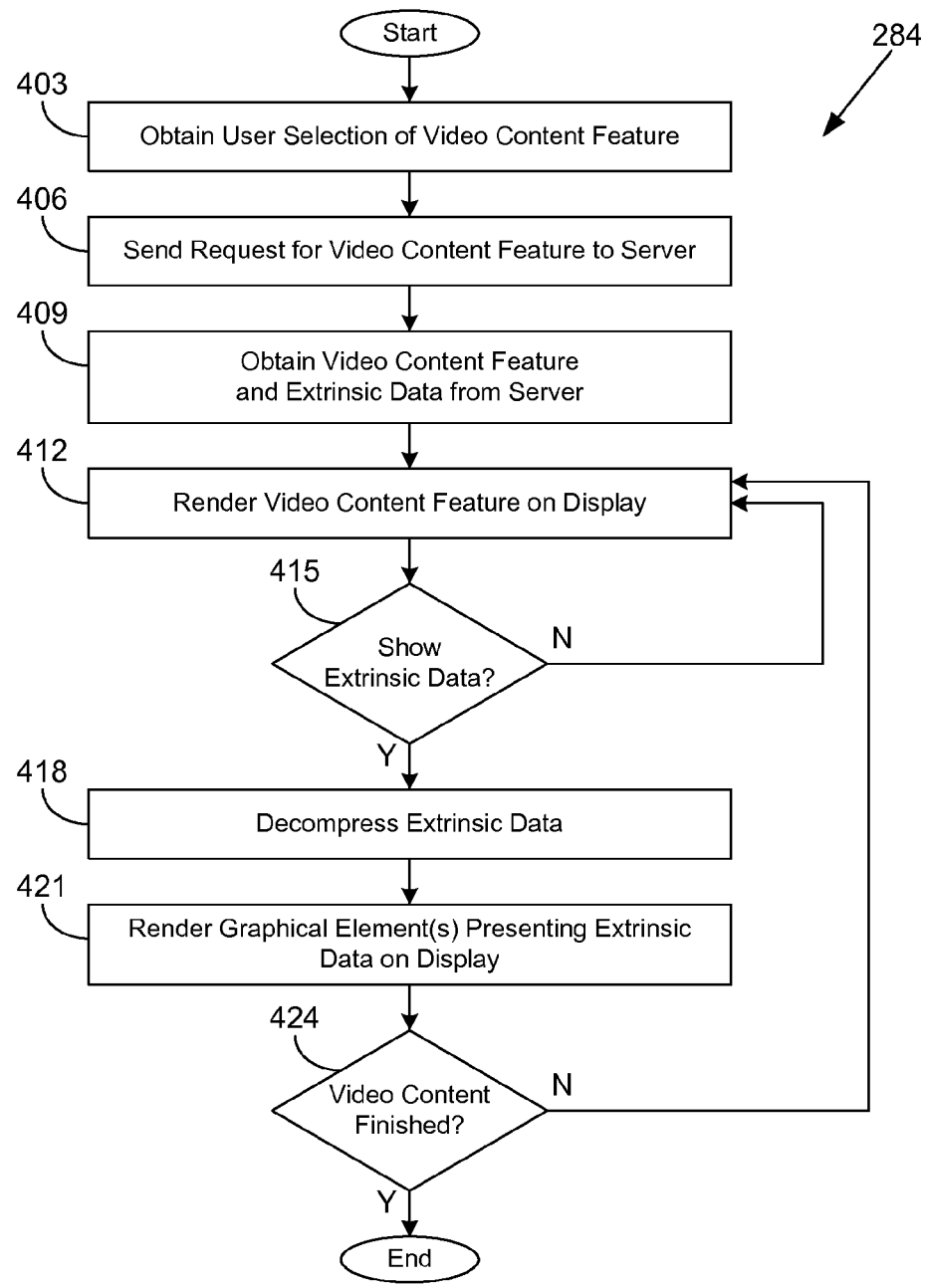
FIG. 4 is a flowchart illustrating one example of functionality implemented as portions of a content access application executed in a client device in the networked environment of FIG. 2 according to various embodiments of the present disclosure.

Referring next to FIG. 4, shown is a flowchart that provides one example of the operation of a portion of the content access application 284 according to various embodiments. It is understood that the flowchart of FIG. 4 provides merely an example of the many different types of functional arrangements that may be employed to implement the operation of the portion of the content access application 284 as described herein. As an alternative, the flowchart of FIG. 4 may be viewed as depicting an example of elements of a method implemented in the computing environment 203 (FIG. 2) according to one or more embodiments.

Beginning with box 403, the content access application 284 obtains a user selection of a video content feature 100 (FIG. 2). In box 406, the content access application 284 sends a video content feature request 224 (FIG. 2) to the content delivery service 215 (FIG. 2). In box 409, the content access application 284 obtains the video content feature and extrinsic data 221 (FIG. 2) from the content delivery service 215 by way of the network 209 (FIG. 2). In box 412, the content access application 284 begins rendering the video content feature 100 on a display 278 (FIG. 2).

In box 415, the content access application 284 determines whether the extrinsic data is to be presented. In this regard, the content access application 284 may be configured via communication with the content delivery service 215 to enable or disable automatic presentation of extrinsic data. This may be a server-side setting in the configuration settings 275 (FIG. 2) or it may be a client-side setting. The extrinsic data may be presented based at least in part on a current time in the video content feature 100. If extrinsic data is not to be shown, the content access application 284 returns to box 412 and continues to render the video content feature 100. If extrinsic data to be shown, the content access application 284 continues to box 418 and may decompress the extrinsic data. If the content access application 284 supports an offline mode, the extrinsic data may contain all images and data used to render graphical elements 103 (FIG. 1A). If an offline mode is not supported, the content access application 284 may request and obtain additional images and/or other data from the content delivery service 215 or other servers as needed.

In box 421, the content access application 284 renders one or more graphical elements 103 presenting at least a portion of the extrinsic data upon the display 278. In box 424, the content access application 284 determines whether the video content feature 100 has finished playback. If the video content feature 100 has not finished, the content access application 284 returns to box 412 and continues rendering the video content feature 100 upon the display 278. If the video content feature 100 has finished, the operation of the portion of the content access application 284 ends.

Figure 5:
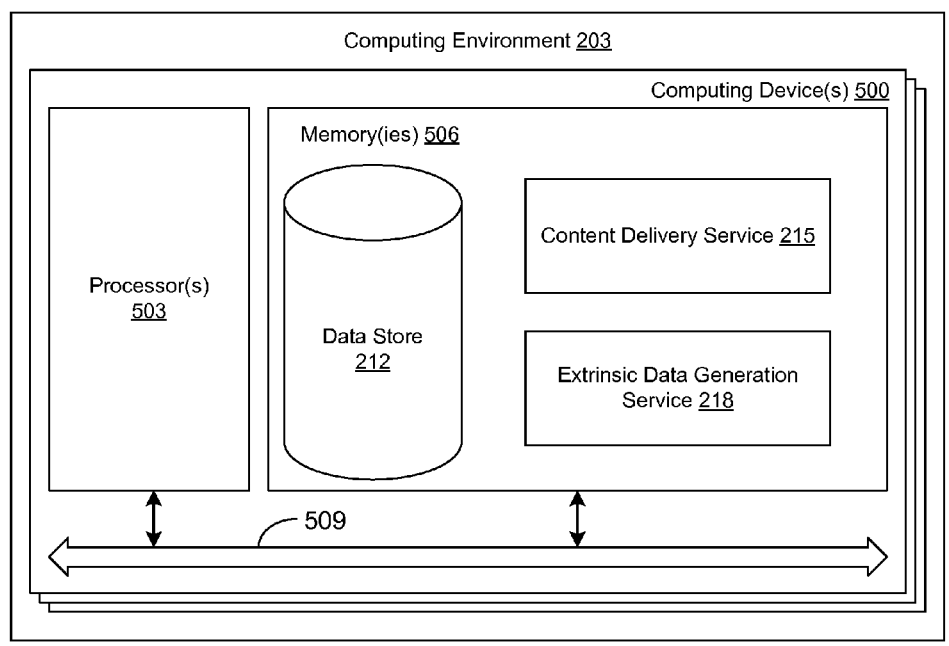
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the content delivery service 215, the extrinsic data generation service 218, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the content delivery service 215, the extrinsic data generation service 218, the content access application 284 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the content delivery service 215 and the content access application 284. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery service 215, the extrinsic data generation service 218, and the content access application 284, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the content delivery service 215, the extrinsic data generation service 218, and the content access application 284, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program, that when executed by at least one computing device, causes the at least one computing device to at least:
   cause a video content feature to be rendered on a display;
   determine whether a user account history indicates that a corresponding user has viewed the video content feature previously;
   determine a resolution used by the display;
   determine an estimated distance between the display and a viewer of the display;
   determine extrinsic data relevant to a current time in the video content feature including at least one of: character information, music information, or trivia information, a quantity of the extrinsic data being based at least in part on whether the user account history indicates that the corresponding user has viewed the video content feature previously; and
   cause a graphical element to be rendered upon the display while the video content feature is also being rendered on the display, the graphical element presenting at least a portion of the extrinsic data, a size of the graphical element being determined as a function of the resolution, the estimated distance, and the quantity of the extrinsic data determined.

2. The non-transitory computer-readable medium of claim 1, wherein the program further causes the at least one computing device to determine a region in which the graphical element is to be rendered based at least in part on an analysis of the video content feature.

3. The non-transitory computer-readable medium of claim 1, wherein the quantity of the extrinsic data is greater and the size of the graphical element is larger when the user account history indicates that the corresponding user has not viewed the video content feature previously.

4. A system, comprising:
   a data store; and
   at least one computing device comprising a processor and a memory, the at least one computing device in communication with the data store and being configured to at least:
      render a video content feature on a display;
      determine whether a user account history indicates that a corresponding user has viewed the video content feature previously;
      determine a resolution of the display;
      determine an estimated distance between the display and a viewer of the display;
      determine extrinsic data relevant to a current scene in the video content feature including at least one of: character information, music information, or trivia information, a quantity of the extrinsic data being based at least in part on whether the user account history indicates that the corresponding user has viewed the video content feature previously; and
      render a graphical element presenting at least a portion of the extrinsic data while the video content feature is also being rendered on the display, wherein a size of the graphical element is determined as a function of the resolution, the estimated distance, and the quantity of the extrinsic data determined.

5. The system of claim 4, wherein appearance control metadata is generated based at least in part on a user account history and a determination to render the graphical element is based in part on the appearance control metadata.

6. The system of claim 4, wherein the at least one computing device is further configured to determine whether to present the extrinsic data further based at least in part on a user account configuration setting that is enabled by default.

7. The system of claim 4, wherein the at least one computing device is further configured to render the graphical element in a region selected so as not to obscure a visual element of the video content feature.

8. The system of claim 7, wherein the visual element corresponds to a face of a character, and the region is selected based at least in part on a detected location of the face.

9. The system of claim 7, wherein the region is selected based at least in part on an analysis of an entirety of the video content feature or an analysis of a frame of the video content feature.

10. The system of claim 4, wherein the at least one computing device is further configured to determine whether an appearance of a character corresponds to a first recognizable appearance of the character in the video content feature.

11. The system of claim 4, wherein the video content feature corresponds to an episode of a series, and the at least one computing device is further configured to determine whether to present the extrinsic data based at least in part on whether a user account history indicates that the corresponding user has already viewed another episode of the series.

12. The system of claim 4, wherein the extrinsic data comprises information about a character that appears in the video content feature, and the at least one computing device is further configured to determine whether to present the extrinsic data based at least in part on whether the current scene corresponds to a first recognizable appearance of the character in the video content feature.

13. The system of claim 4, wherein the extrinsic data comprises information about a music track that is featured in the video content feature, and the at least one computing device is further configured to determine whether to present the extrinsic data based at least in part on whether the current scene corresponds to a play of the music track in the video content feature.

14. The system of claim 4, wherein the at least one computing device is further configured to determine whether an offline mode is supported, wherein the extrinsic data comprises all images and data necessary to render the graphical element when the offline mode is supported.

15. The system of claim 14, wherein the at least one computing device is further configured to decompress the extrinsic data to extract the images and data necessary to render the graphical element.

16. A method, comprising:
- causing, via at least one computing device comprising a processor and a memory, a video content feature to be rendered on a display;
- determining, via the at least one computing device, whether a user account history indicates that a corresponding user has viewed the video content feature previously;
- determining, via the at least one computing device, a resolution used by the display;
- determining, via the at least one computing device, an estimated distance between the display and a viewer of the display;
- determining, via the at least one computing device, extrinsic data that is relevant to a current scene in the video content feature including at least one of: character information, music information, or trivia information, a quantity of the extrinsic data being based at least in part on whether the user account history indicates that a corresponding user has viewed the video content feature previously; and
- causing, via the at least one computing device, a graphical element to be rendered on the display while the video content feature is also being rendered on the display, the graphical element including at least a portion of the extrinsic data, a size of the graphical element being determined as a function of the resolution, the estimated distance, and the quantity of the extrinsic data determined.

17. The method of claim 16, wherein causing the graphical element to be rendered further comprises determining, via the at least one computing device, that a configuration setting that is enabled by default has not been disabled.

18. The method of claim 16, wherein the graphical element includes a name of a character, a name of a cast member who is performing the character, and an image of the character.

19. The method of claim 16, further comprising causing, via the at least one computing device, the graphical element to be positioned at a location upon the display based at least in part on a visual analysis of the video content feature.

20. The method of claim 16, further comprising;
- determining, via the at least one computing device, that an appearance of a character in the current scene of the video content feature corresponds to a first recognizable appearance of the character in the video content feature; and
- refraining, via the at least one computing device, from rendering information about the character upon the display upon a subsequent appearance of the character in a subsequent scene of the video content feature.

\* \* \* \* \*